Jan. 23, 1934.    A. E. ROBINSON    1,944,828
LUBRICATING MEANS FOR METAL SHAPING MACHINES
Filed Jan. 25, 1932    4 Sheets-Sheet 4
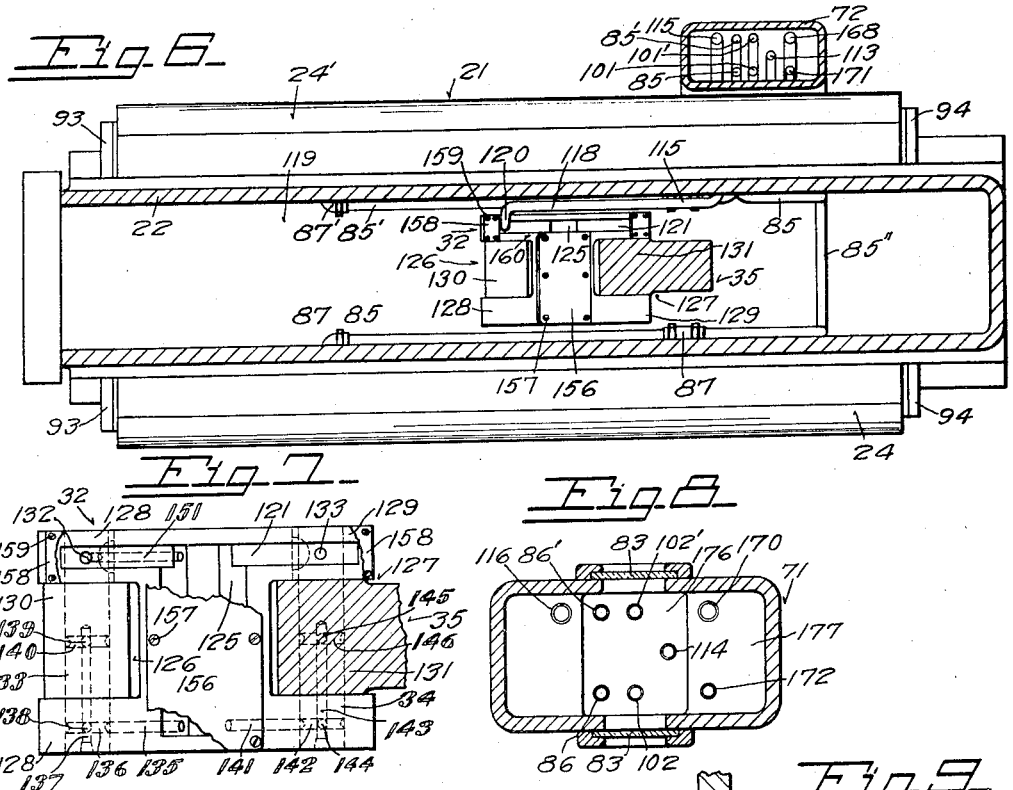
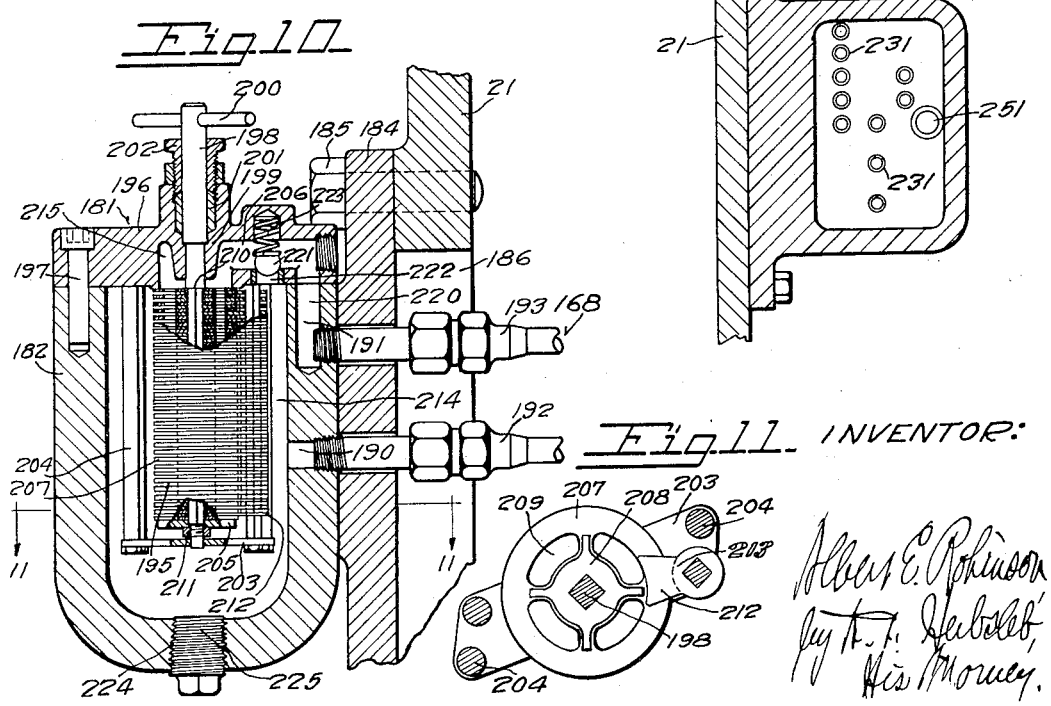
INVENTOR:
Albert E. Robinson Patented Jan. 23, 1934

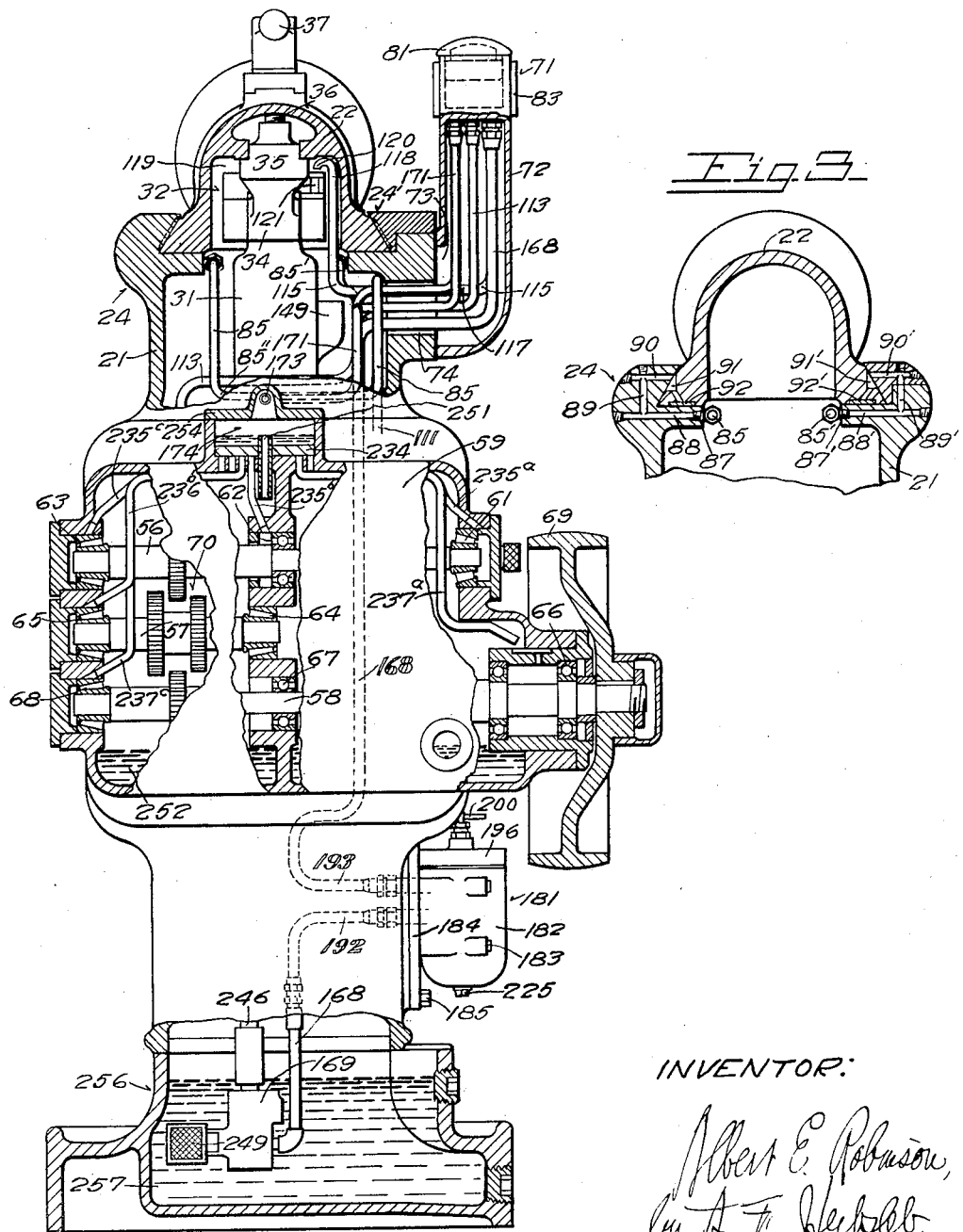

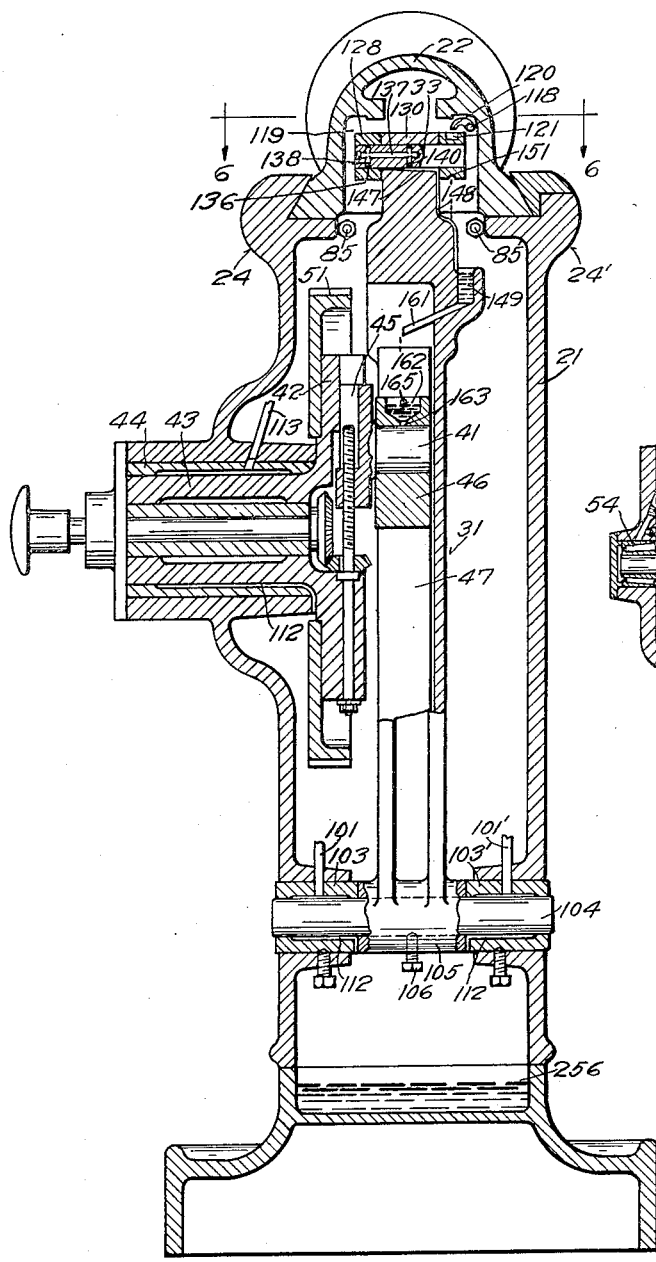
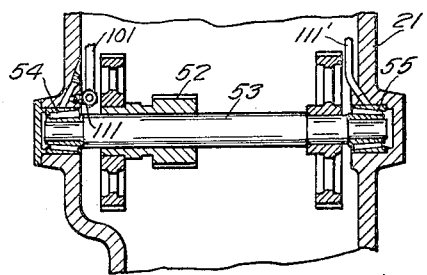

1,944,828

UNITED STATES PATENT OFFICE 1,944,828

LUBRICATING MEANS FOR METAL SHAPING MACHINES

Albert E. Robinson, Cincinnati, Ohio, assignor to The American Tool Works Company, Cincinnati, Ohio, a corporation of Ohio Application January 25, 1932. Serial No. 588,650

4 Claims. (Cl. 184—6)

My invention relates to lubricating means for metal shaping machines, and it is the object of my invention to provide simple and effective means for lubricating the various operating parts in a shaping machine.

It is the object of my invention, further, to provide novel means for lubricating the jointing means between the upper end of the operating arm and the ram in a metal shaping machine.

It is the object of my invention, further, to provide a lubricant reservoir at the top of the machine and stationary lubricant conduits leading in novel manner therefrom to or in adjacency to the bearings between the operating arm and its connecting link, and between the operating arm and the link respectively and the ram and the frame; and, further, to permit the lubricant to pass through said conduits by gravity and thereby relieve said bearings and the journals thereof from the friction of lubricant under pressure between the relatively movable faces in said bearings.

It is the object of my invention, further, to provide a conduit leading from said upper reservoir transversely to and underneath and in adjacency to a guideway between the frame and the ram for delivering lubricant to the journal and bearing surfaces between the upper end of the operating arm and the ram; further, to permit supply of the lubricant to said surfaces in novel manner while the upper end of the operating arm is moving back and forth to operate the ram; and, further, to provide movable lubricant receiving means at the upper end of the operating arm with an elongated mouth for prolonging the reception of lubricant for said upper end of the operating arm during movements of said upper end relatively to a lubricant supplying conduit.

It is the object of my invention, further, to provide a relatively stationary lubricant conduit extending upwardly into the cavity of the reciprocating ram at the side of the path of the operating arm for the ram, and having a discharge mouth in said cavity positioned to discharge lubricant at the upper end of said arm during vibratory movements of said upper end; and, further, to provide an elongated lubricant receiving mouth at said upper end extending lengthwise of the path of said upper end for prolonging the period of reception of the lubricant.

It is the object of my invention, further, to provide an upper link between the operating arm and the ram with a lubricant receiving recess into which the lubricant discharges from a relatively stationary lubricant conduit while said link traverses the delivering end of said lubricant conduit, and novel means for feeding the lubricant delivered to said link to the articulations at the ends of said link, and the crankblock and crank of the operating arm.

The invention will be further readily understood from the following description and claims, and from the drawings, in which latter:

Fig. 2 is an end elevation of the same, partly broken away, and partly in section on the irregular line 2—2 of Fig. 1.

Fig. 3 is a cross-section of a detail of the same, taken in the plane of the line 3—3 of Fig. 1.

Fig. 4 is a vertical cross-section of the same, taken in the plane of the line 4—4 of Fig. 1.

Fig. 5 is a vertical cross-section of a detail, taken in the plane of the line 5—5 of Fig. 1.

Fig. 6 is a horizontal section of my improved device, taken in the plane of the line 6—6 of Fig. 4.

Fig. 7 is a plan view of the pivotal connecting means between the upper end of the lever arm and the ram exemplified, and the lubricating means therein, partly in section and partly broken away.

Fig. 8 is a horizontal section of the upper distributing reservoir with the felt strainer removed, taken on the line 8—8 of Fig. 1.

Fig. 9 is a similar view of the secondary distributing reservoir, taken on the line 9—9 of Fig. 1.

Fig. 10 is a cross-section of a detail of the same, taken on the line 10—10 of Fig. 1; and, Fig. 11 is a cross-section of the same, taken in the plane of the line 11—11 of Fig. 10.

Figure 1:
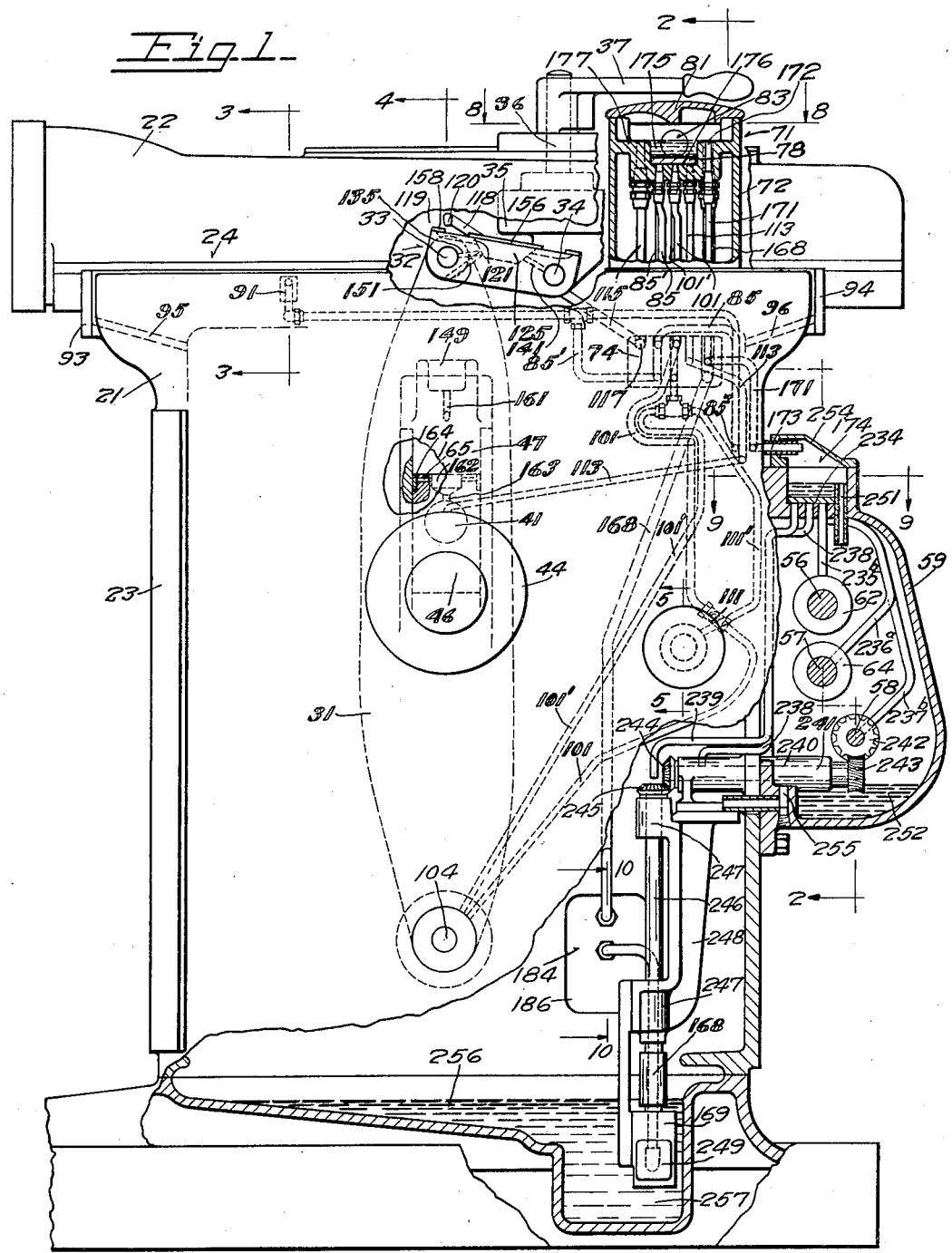
Fig. 1 is a side elevation of my improved device, partly broken away for better illustration of parts.

The metal shaping machine exemplified comprises a column or frame 21 on which a ram 22 reciprocates lengthwise. The ram is arranged to receive a usual cutting tool which is usually mounted on a head slidable on the forward end of the ram having suitable feeding movements imparted thereto.

The tool is caused to reciprocate crosswise of the work supported for example on a table adjustable on guides 23 on the frame in usual manner. Guides 24, 24', are at the respective sides of the ram between the frame and the ram, exemplified as comprising horizontally disposed guide faces on the frame, complemental horizontally disposed guide faces on the ram, slanting guide faces on the frame and complemental slating guide faces on the reciprocating ram.

The ram is caused to reciprocate by means of an oscillating arm, or rocker arm 31, which is a lever arm and has pivotal connecting means at its respective ends with the frame and the ram. The pivotal connecting means between the lever arm and the ram is exemplified as comprising a link 32 having articulations 33 and 34 respectively with the lever arm and the ram.

The connection of the ram end of the link with the ram is through means of a block 35, which comprises a nut having threaded connection with a screw-rod 36, journaled in the ram and arranged for having feed or positioning relations imparted thereto for feeding or positioning the ram lengthwise. The block is arranged to be clamped to the ram at suitable positions lengthwise of the ram in usual manner, including a clamping handle 37.

The lever arm is rocked by means of a crankpin 41, on the bull-wheel 42, having a hub 43 journaled in a bearing 44 on the frame. The crank is on a crank-slide 45, adjustable in usual manner in radial direction on the bull-wheel toward and from the axis of the bull-wheel for adjusting the lengths of stroke or angles of reciprocations of the lever arm. The crank is journaled in a crank-block 46 which has reciprocations in a guideway 47 in the lever arm, the crankblock having slide connections with the walls of said guideway.

A gear 51 is shown as part of the bull-wheel and is meshed by a pinion 52 on a shaft 53, journaled in bearings 54, 55, in the frame. The shaft 53 has various speeds imparted thereto by driving gearing which comprises suitable speed-changing mechanism communicating with gearing on the shaft 53 for imparting various selective speeds to the shaft 53, and thereby reciprocating the oscillating, rocker or lever arm at different speeds. This speed changing mechanism may comprise suitable gearing on shafts 56, 57, 58, journaled in bearings in a housing 59, detachably secured to the frame.

Bearings 61, 62, 63, are provided for the shaft 56, bearings 64, 65, are provided for the shaft 57, and bearings 66, 67, 68, are provided for the shaft 58. These bearings are located in the housing. A pulley 69 is on the shaft 58 for receiving motion from a suitable source of power. The speed changing mechanism is exemplified generally at 70.

The lubricating means comprise an upper feeding reservoir 71, shown on a bracket 72 secured to the frame. This bracket is hollow, having a bore 73 therein, which registers with an opening 74 in the side of the frame. The reservoir has a bottom in which there are holes, with which the upper ends of pipes connect in suitable manner for receiving lubricant from the reservoir. A porous filtering pad 78 rests on this bottom. The reservoir is provided with a cover 81 which may be loose on the reservoir. The sides of the reservoir are provided with sights 83 of glass, suitably fastened to said sides, through which to observe the height of the lubricant in the reservoir. The lubricant, instanced as oil, is preferably fed from the reservoir by gravity.

Pipes 85, 85' connect with holes 86, 86' in the reservoir 71, pass through the opening 74, and extend along the guideways between the ram and the frame, at the respective sides of the ram, being provided with branches 87, 87', which connect with horizontal oil passages 88, 88' in the frame, which latter communicate with upright oil passages 89, 89', connecting with horizontal oil passages 90, 90', opening at the side faces of the guideways, the ram having passages 91, 91', therein communicating with the passages 90, 90', and discharging upon pads 92, 92' in the faces of the horizontal guideways between the ram and the frame. The pipe 85 has a loop 85'' therein outside the path of the lever arm for conveying the lubricant to the other side of the machine. The faces of the guideways are provided with suitable grooves, cavities and pads for distributing the oil on said faces.

The respective ends of the faces of the respective guideways on the reciprocating ram are contacted by wipers 93, 94, for wiping the lubricant from the overhanging portions of the guide faces on the ram, and directing the same back into the interior of the frame through passages 95, 96, in the frame. There is a plurality of passages and pads at each side of the ram.

Pipes 101, 101', have suitable connections with holes 102, 102', in the bottom of the upper reservoir, descend therefrom through the opening 74, and are let into stationary bearings 103, 103', of the axle 104 forming the lower pivot for the lever arm 31. The lower end of the lever arm is provided with a bearing 105 in which said axle is fixed by a set bolt 106.

Branch pipes 111, 111', extend from the pipes 101, 101', and are received in holes in the bearings 54, 55, of the shaft 53, for lubricating said bearings.

The lubricant passes into the interior of the frame after such lubrication. The bearings are provided with longitudinal slits 112 opening into the interior of the frame for leading the lubricant into the interior of the machine. All of the bearings are preferably provided with such slits.

A pipe 113 is connected with the hole 114 in the bottom of the upper reservoir 71 and leads to the bearing 44 of the hub 43 of the bull-wheel.

A pipe 115 connects with a hole 116 in the upper reservoir, descends from said reservoir and extends loopwise, as at 117, through the opening 74, and upwardly loopwise about the guideways at one side of the ram between the ram and the frame, close to said guideways, the upward extension 118 thereof extending into the hollow 119 in the ram, which hollow opens downwardly, and in which hollow the upper end of the lever arm, the link at the upper end thereof and the bearings therefor are located.

This upward extension extends diagonally lengthwise of the ram, and is at its upper end provided with an inwardly and downwardly projected mouth 120, which is arranged to discharge lubricant for the upper bearing means of the lever arm. This upward extension is preferably stationary and is located between the reciprocating side wall of the ram and the reciprocating upper end of the lever arm and its link.

The pivotal connecting means between the upper end of the lever arm and the ram is provided with an elongated recess 121, which is shown in the upper part of the link 32. The mouth of the lubricant pipe 115 discharges into this lubricant recess as the lubricant recess reciprocates under the mouth 120.

The length of reciprocation of these pivotal connecting means may be longer than the recess, and if so, the lubricant may, during a portion of its flow, discharge beyond the ends of the recess, aiding in lubricating the joints of these upper articulating means and the ram, and the crank-block and crank-pin in the arm, or may discharge into the frame of the machine. The discharge from the mouth is preferably through space.

The discharging end of the mouth is preferably spaced above its receiving recess sufficiently to have the walls of the recess thereof reciprocate freely under the mouth. The lubricant recess 121 extends lengthwise of the path of reciprocation of the arm and is preferably sufficiently long to receive abundant lubrication from the mouth 120.

The link 32 is also provided with a cross lubricant recess 125, which communicates with the lengthwise recess 121. The link is provided with forks 126, 127, at its resepective ends. The forks have bearings 128, 129, between which central bearings 130, 131, are located. The latter bearings are respectively at the upper end of the lever arm and on the block 35.

The journal pin 33 is received in the bearings 128, and is fixed in one of said bearings by a pin 132. The journal pin 34 is located in the bearings 129, and is fixed in one of said bearings by a pin 133.

A passage 135 extends from the lubricant recesses lengthwise of the fork 126 of the link and opens into an annular groove 136 in the pin 33. An axial lubricant bore 137 is in said pin, the outer end of which is closed by a plug. Cross holes 138 in the pin connect the annular groove 136 with the axial bore for feeding lubricant to the latter. Cross holes 139 connect the axial bore 137 with an annular groove 140 in pin 33, the pin having suitable lubricant grooves therein connecting with the annular groove 140 for distributing lubricant throughout the interior of the bearing 130 at the upper end of the lever arm.

A lubricant passage 141 extends from the lubricant recesses in the link in the opposite direction lengthwise of the link and registers with an annular groove 142 in the journal pin 34, which has an axial lubricant passage 143 therein, closed by a threaded plug at its outer end. Cross holes 144 connect the annular groove 142 and the axial passage 143. Cross holes 145 connect the axial lubricant passage 143 with an annular lubricant groove 146 in the periphery of the pin 34, the pin being provided with suitable lubricant grooves connecting with the annular groove 146 for distributing lubricant throughout the interior of the bearing on the block 35.

The annular groove 140 in the pin 33 communicates with a groove 147 below said pin in the upper bearing 130 of the lever arm. The groove 147 is continued as a groove 148 on the upper part of the lever arm, for receiving lubricant from the lubricant recesses in the link through the passages 135, 136, 138, 137, 139, 140, and discharging into a lubricant recess 149 at the side of the upper part of the lever arm.

The link is provided with a lubricant bore 151 connecting with the lubricant recess in the link. This lubricant bore or passage extends lengthwise of one of the tines of the fork 126 of the link, passing through the body of one of the bearings 128, by-passing the journal face of the pin therein, and discharging above the lubricant recess 149, as into the passage 148, for feeding said recess. In the form shown it supplements the lubricant passing through the passage 140.

The recess 125 is provided with a cover 156, releasably secured to the link by screws 157. The ends of the lengthwise recess 121 are provided with covers 158, releasably secured to the link by screws 159. This leaves a lengthwise slot 160 above the recesses, into which the oil discharges from the spout 120. The covers prevent the oil from spilling over the ends of the recesses during the reciprocations of the ram.

A lubricant passage 161 extends from the recess 149, through which the lubricant passes and drips into an oil recess 162 in the upper end of the crank block 46. The lower end of this oil recess has a hole 163, which communicates with the journal face in the bearing of the crank-block. Filter pads 164 are located in slots in the side edges of the crank-block, holes 165 communicating therewith from the oil recess 162. These filter pads contact with the slideway in which the crank-block reciprocates for lubricating the same.

An inflow pipe 168 communicates with a pump 169, and extends through the opening 74 and communicates with a passage 170 in the upper reservoir.

An outflow pipe 171 is connected with an outflow passage 172 in said reservoir and with a hole 173 in a second feeding lubricant reservoir 174, located above the driving gearing.

The upper ends of the lubricant passages 116 and 172 are above the levels of the upper ends of the lubricant passages 86, 86', 102, 102' and 114, and the lubricant passages 116 and 172 are of such capacity as to readily drain the oil thereabove. In the present exemplification the lubricant reservoir 71 is provided with a lubricant cavity 175, in the bottom 176 of which the upper ends of the holes 86, 86', 102, 102' and 114 are located. This reservoir is also provided with a bottom 177, forming shelves, above the bottom 176. The upper ends of the holes 116, 172, open in the bottom or shelves 177, at a level above the upper ends of holes in the bottom 176 and above the filtering pad 78. This pad is highly porous but sufficiently obstructive to form a body of lubricant above said pad communicating with the holes 116, 172. These holes permit unobstructed passage of the oil thereinto, so that all the oil pumped into the reservoir 71 above the quantity necessary to supply the cavity 175, readily flows through the holes opening at a level above the pad 78, instanced as the holes 116 and 172, in order that pressure above atmospheric pressure is avoided in the reservoir 71, and a copious and steady flow of oil takes place through all the lubricant passages fed by said reservoir, for feeding the lubricant by gravity to the various points of lubrication supplied thereby. The height of this body of lubricant may be observed through the sights 83.

The outflow pipes 115 and 171 and their passages are of such diameters, that, added to the outflow capacities of the feed passages communicating with the holes in the bottom 176 of the reservoir 71, outflow of the oil from the upper reservoir above the level of the outflow openings 115 and 172 is assured, and sufficient supply of oil for the secondary lubricant feeding reservoir 174 for its lubricating purposes is assured, and greater than atmospheric pressure upon the oil feeding to the joints of the lever arm and link and the crank mechanism thereof is avoided, thereby avoiding the friction of such greater pressure upon said joints and coacting surfaces.

An oil filter 181 is interposed in the pipe 168. It is exemplified as comprising a casing 182, which is secured by bolts 183 to a plate 184 bolted to the frame of the machine by bolts 185 and closing an opening 186 in the frame. The casing is secured to the outside of the frame of the machine. The filter has an inlet port 190 and an outlet port 191, with which respectively the infeeding branch 192 and the outfeeding branch 193 of the inflow pipe 168 communicate, these branches being secured in said ports. A rotary cylindrical filter screen 195 is located in the casing. It is supported from a cover 196, releasably secured to the casing by bolts 197. It is rotatable with a shaft 198 journaled in a bearing 199 in the cover, and having a handle 200. There is a suitable packing 201 and gland 202 between the shaft and its bearing in the cover.

A hanger-plate 203 is suspended from the cover by tie-rods 204. The lower end of the shaft 198 is journaled in said hanger plate. The lower end of said filter cylinder is closed by a plate 205, and the upper end of the cylinder discharges into a recess 206 in the cover. The filter cylinder may comprise disks 207, which are separated by central washers 208 and are provided with registering passages 209. These disks and washers are alternately arranged on the shaft 198 and clamped between a shoulder 210 on said shaft and the plate 205, by a clamp nut 211 threaded to the lower end of the shaft. Cleaning fins 212, separated by washers 213, are alternately clamped on one or more of the tie-rods, the cleaning fins being located in the spaces between the disks of the filter cylinder and reach inwardly as far as the passages. The fins are provided with lateral slanting faces slanting acutely toward the outer periphery of the disks, for urging smudge between the disks outwardly upon rotation of the cylinder. The spaces between the disks and the fins are very thin for effectively filtering the oil. Upon rotation of the filter cylinder by the handle 200, the spaces between the disks of the filter cylinder are cleaned for renewing the filtering capacity of the cylinder.

The filter cylinder divides the filter into an inflow compartment 214 and an outflow compartment 215. The branch 192 from the pump leads into the inflow compartment, and the branch 193 communicates with the outflow compartment. This latter communication is had through a passage 220 in the cover and casing. A safety check-valve 221 is in a passage 222 between the outer compartment and the passage 220, being shown as a ball seated on the wall of the passage 222 and backed by a spring 223.

If there should be excess pressure in the outer compartment, due to clogging of the filter screen, the oil may have relief through this check valve for insuring feed of oil into the upper reservoir.

The casing of the filter is provided with a cleaning opening 224, normally closed by a threaded plug 225, which may be opened for draining the filter and permitting discharge of the sludge and sediment out of the casing. This cleaning means is outside the frame of the machine for ready access, while the lubricant passages are on the inside of the machine. This filter forms a main mechanical cleaning filter for the lubricant between the pump and the reservoirs.

The secondary lubricant feeding reservoir 174 is provided with a suitable number of holes 231 in its bottom, on which a filtering pad 234 rests.

The secondary lubricant feeding reservoir 174 is therewith which feed the oil to the bearings of the respective shafts 56, 57, 58, represented by pipes 235ª, 235ᵇ and 235ᶜ, which communicate with certain of the holes 231, the other ends of said pipes having communications with the bearings 61, 62, 63, in which the driving shaft 56 is journaled. Pipes 236ª, 236ᵇ, communicate with certain of the holes 231, the other ends of the pipes being received in holes in the bearings 64, 65, of the driving shaft 57. Pipes 237ª, 237ᵇ and 237ᶜ, communicate with others of the holes 231 and with the bearings 66, 67, 68, of the shaft 58.

Oil pipes 238, 239, communicate with certain of the holes 231. The pipe 238 communicates with a bearing 240 which has a shaft 241 therein, which is driven from the drive shaft 58 by means of spiral gears 242, 243. The shaft 241 is at its other end provided with a bevel pinion 244, meshing with a pinion 245, on an upright shaft 246, journaled in bearings 247 on a bracket 248 in the interior of the frame secured to the frame. The shaft 246 is the pump shaft for driving the pump 169. The pipe 239 discharges upon the bevel pinions for lubricating the same and the bearings of said upright shaft. The pump is of suitable or usual construction. The infeeding port of the pump is provided with a sieve 249.

An outflow passage 251 has its opening at sufficient height in the secondary feeding reservoir to maintain a body of oil therein and discharge the excess oil through it into a lubricant collecting reservoir 252 located below the driving gearing. The secondary feeding reservoir is provided with a removable cover 254, for covering an opening in said reservoir through which oil may be supplied for the oiling system.

An outflow passage 255 communicates with the reservoir 252, the upper end of this passage being at a level in the wall of the reservoir to determine the level of lubricant therein in order to permit the drive gears to dip into the lubricant in this reservoir for lubricating the gears.

The overflow of the reservoir 252 passes through this passage for being received in a lower collecting reservoir 256, having a depression 257 therein, in which the infeeding port of the pump is located. The pump is shown mounted on the bracket 248 on which the bearings for the upright shaft 246 are located.

In the present invention the lubricant is pumped from the lower collecting reservoir to the upper feeding reservoir, which latter is at a level above the guideways between the reciprocating ram and the frame, so that all parts of the machine lubricated from said upper reservoir are supplied with lubricant by gravity and excess pressure on the lubricant is avoided in all the bearings and relatively movable parts supplied with lubricant. In order to insure such gravity feed, the pump is of such capacity as to pump only sufficient oil for maintaining the desired level of oil in the upper reservoir, and the outflow passages therefrom are sufficiently large to insure this level.

All of the oil pumped into the upper reservoir is pumped through an oil filter between the pump and the upper reservoir, this filter having an outlet cleaning opening at the outside of the frame of the machine, so that the filter may be readily drained, and the filter is also provided with a cleaning handle at the outside of the machine. The cleaning and draining of the filter from the outside of the machine insures ready attention to the same, in order that clean lubricant of sufficient quantity is supplied to the lubricating system of the machine.

The feeding lubricant reservoirs are also supplied with filtering pads, which may be readily raised out of the reservoirs, by lifting the removable covers of said respective reservoirs and taking out and cleaning and replacing said filter pads for additional assurance of the feeding of clean oil to the lubricated parts.

The lubricant for the upper pivotal connections of the oscillating, rocker or lever arm between said arm and the ram are supplied by a stationary pipe, which is arranged loopwise about the guideways between the ram and the frame at one side of the ram and extends upwardly into the hollow of the ram, for feeding lubricant through space to said upper pivotal connections. The lubricant is received from the pipe into an elongated recess so as to enlarge the time of reception of the lubricant by said upper pivotal connections.

My improved device provides ready means, of simple and economical construction, for lubricating all parts of the machine with sufficient lubricant, and insures the passage of lubricant by gravity to all relatively movable faces, and avoids the friction of pressure above atmospheric pressure on the lubricant between said faces.

The pipe from the upper reservoir about the upper guideways between the ram and the frame and supplying lubricant to the upper pivotal connecting means between the arm and the ram is arranged close about said guideways and is short for reducing the friction between the oil and the pipe to the minimum, and insuring a free supply of lubricant to the upper portions of the arm and its connections and to the crank and crankblock.

Having thus fully described my invention, what I claim as new, and desire to secure by Letters Patent, is:

1. In a metal shaping machine, the combination of a frame, a ram reciprocable thereon, a lever arm, a crank block slidable thereon, a crank pin for said crank block, means for operating the latter, a link between the upper end of said arm and said ram, said link provided with a fork, bearings on the tines of said fork, a bearing at the upper end of said arm, an articulating pin in said bearings, said link having a lubricant cavity and provided with a lubricant passage between said cavity and said pin and a lubricant passage connecting with said cavity and by-passing the journal faces of said bearings and delivering lubricant to said crank pin and said crank block.

2. In a metal shaping machine, the combination of a frame, a ram reciprocable thereon, a lever arm, a crank and a crank block for operating said lever arm, a link, pivotal connecting means between the respective ends of said link and the upper end of said lever arm and said ram respectively, said link provided with a lengthwise lubricant cavity extending lengthwise of said link, lubricant passages between said lubricant cavity and said pivotal connecting means, covers for the respective ends of said lengthwise lubricant cavity for holding lubricant in said cavity during lengthwise reciprocations of said ram, leaving a lubricant receiving slot for said lubricant cavity between said covers, and a lubricant discharging mouth discharging lubricant into said slot.

3. In a metal shaping machine, the combination of a frame, a ram reciprocable thereon, a lever arm, a crank and a crank block for operating said lever arm, pivotal connecting means between the upper ends of said lever arm and said ram for reciprocating said ram, a lengthwise lubricant reservoir at said upper end of said arm extending lengthwise of the path of reciprocation of said ram and movable with the upper end of said lever arm, a lubricant passage between said lengthwise lubricant reservoir and said pivotal connecting means, spaced apart covers for the respective ends of said lengthwise lubricant reservoir for holding lubricant in said reservoir during lengthwise reciprocations of said ram and leaving a lengthwise opening into said reservoir between said covers, and a lubricant discharging mouth discharging lubricant into said lengthwise opening.

4. In a metal shaping machine, the combination of a frame, a horizontal guide thereon, a horizontally positioned ram reciprocable on said frame guided by said guide, a lever arm having pivotal connection at its lower end with said frame, a crank and a crank block for operating said lever arm and including pin and slide connections between said crank and an intermediate portion of said lever arm reciprocating the upper portion of said lever arm lengthwise of said guide between the ends of said guide, pivotal connecting means between the upper end of said lever arm and said ram for reciprocating said ram, a reciprocating lubricant reservoir reciprocating with the upper portion of said lever arm, said lubricant reservoir provided with an elongated feed slot extending lengthwise of said guide between the ends of said guide and movable lengthwise with the reciprocations of said upper portion of said lever arm, a lubricant passage between said reciprocating lubricant reservoir and said pin and slide connections, a lubricant reservoir at the top of said frame, a lubricant pipe leading from the latter and having a mouth adjacent to but spaced from said reciprocating lubricant reservoir and feeding lubricant into said elongated feed slot, and covers for the respective ends of said reciprocating lubricant reservoir at the respective ends of said elongated feed slot arranged to counteract the endwise movements of the lubricant in said reciprocating lubricant reservoir.

ALBERT E. ROBINSON.